(12) United States Patent
Wendt (10) Patent No.: US 9,729,050 B2
(45) Date of Patent: Aug. 8, 2017

(54) POWER SUPPLY DEVICE (71) Applicant: PHILIPS LIGHTING HOLDING B.V., Eindhoven (NL)

(72) Inventor: Matthias Wendt, Würselen (DE)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/419,305

(22) PCT Filed: Jul. 16, 2013

(86) PCT No.: PCT/IB2013/055845
§ 371 (c)(1),
(2) Date: Feb. 3, 2015

(87) PCT Pub. No.: WO2014/024064
PCT Pub. Date: Feb. 13, 2014

(65) Prior Publication Data
US 2015/0194881 A1    Jul. 9, 2015

Related U.S. Application Data (60) Provisional application No. 61/680,318, filed on Aug. 7, 2012.

(51) Int. Cl.
H02M 3/156      (2006.01)
H05B 33/08      (2006.01)
(Continued)

(52) U.S. Cl.
CPC ............. *H02M 3/156* (2013.01); *H02M 1/08* (2013.01); *H05B 33/0848* (2013.01); *H05B 37/0254* (2013.01); *H02M 2001/0048* (2013.01)

(58) Field of Classification Search
CPC ................... H02M 1/08; H02M 3/156; H02M 2001/0048; H05B 33/0848; H05B 37/0254
See application file for complete search history.

(56) References Cited

U.S. PATENT DOCUMENTS

2007/0115208 A1*  5/2007  Moulis, Jr. ............ G09F 9/33
                                                      345/39
2007/0262724 A1   11/2007  Mednik et al.
(Continued)

FOREIGN PATENT DOCUMENTS

CN    102595678 A    7/2012
JP    2010015887 A    1/2010
WO   2011055284 A2    5/2011

*Primary Examiner* — Matthew Nguyen
(74) *Attorney, Agent, or Firm* — Akarsh P. Belagodu (57) ABSTRACT

The invention relates to a power supply device (3) for supplying power to an electrical consumer (2) having a variable power consumption in a power distribution system (1), particularly in a DC power distribution system for lighting applications, wherein the power supply device (3) is output current controlled and is adapted to provide the output current depending on the power consumed by the electrical consumer (2). Since the output current is not constant, but controlled depending on the power consumed by the electrical consumer (2) being preferentially a lamp, the output current can be adapted to the actually consumed power, thereby allowing for an improved efficiency of distributing the power in the power distribution system (1). In particular, if less power is consumed by the electrical consumer (2), a lower output current can be provided, thereby reducing losses in cables and electrical connectors of the power distribution system.

17 Claims, 3 Drawing Sheets (51) Int. Cl.
*H05B 37/02* (2006.01)
*H02M 1/08* (2006.01)
*H02M 1/00* (2006.01)

(56) References Cited

U.S. PATENT DOCUMENTS

| | | | |
|---|---|---|---|
| 2010/0026191 A1* | 2/2010 | Radermacher | H05B 33/0815 315/149 |
| 2010/0026215 A1 | 2/2010 | Warton | |
| 2011/0031900 A1 | 2/2011 | Deurenberg et al. | |
| 2011/0267375 A1 | 11/2011 | Yang et al. | |
| 2012/0062145 A1 | 3/2012 | Kao et al. | |
| 2013/0141007 A1 | 6/2013 | Wood et al. | |
| 2013/0147359 A1* | 6/2013 | Chobot | H05B 33/0857 315/122 |

* cited by examiner

POWER SUPPLY DEVICE

FIELD OF THE INVENTION

The invention relates to a power supply device for supplying power to an electrical consumer having a variable power consumption in a power distribution system. The invention relates further to a power distribution system comprising the power supply device and the electrical consumer, a power distribution method and a power distribution computer program.

BACKGROUND OF THE INVENTION

Systems are known which use Ethernet cables for electrically connecting a power supply device, which may be output voltage controlled or output current controlled, and one or several electrical consumers, which may have a variable power consumption. For instance, the one or several electrical consumers can be a lamp having a dimming function for modifying the intensity of the emitted light and, thus, for modifying the power consumption.

If the power supply device is output current controlled, it provides a constant nominal current over the Ethernet cable, wherein voltage drops are present in the Ethernet cable and in the electrical connectors connecting the Ethernet cable with the power supply device and the one or several electrical consumers, respectively. These voltage drops reduce the efficiency of distributing power in the power distribution system.

SUMMARY OF THE INVENTION

It is an object of the present invention to provide a power supply device for supplying power to an electrical consumer having a variable power consumption in a power distribution system, which allows for an improved efficiency of distributing the power within the power distribution system. It is a further object of the present invention to provide a power distribution system comprising the power supply device and the electrical consumer and a corresponding power distribution method and power distribution computer program.

In a first aspect of the present invention a power supply device for supplying power to an electrical consumer having a variable power consumption in a power distribution system is presented, wherein the power supply device is output current controlled and is adapted to provide the output current depending on the power consumed by the electrical consumer.

Since the output current is not constant, but controlled depending on the power consumed by the electrical consumer, the output current can be adapted to the actually consumed power, thereby allowing for an improved efficiency of distributing the power in the power distribution system. In particular, if less power is consumed by the electrical consumer, a lower output current can be provided, thereby reducing losses in cables and electrical connectors of the power distribution system.

The power distribution system is preferentially a direct current (DC) power distribution system, i.e. a system using a unidirectional current, wherein the amplitude of the DC output current can be modified depending on the power consumed by the electrical consumer.

The power consumed by the electrical consumer may be variable by using a pulse-width modulated shunt switch, wherein the electrical consumer may comprise a user control unit for allowing a user to control the pulse-width modulation (PWM) for varying the power consumed by the electrical consumer. The user control unit can be adapted to control the duty cycle of the PWM for varying the power consumed by the electrical consumer. For instance, the electrical consumer can be a lamp and the user control unit, PWM and the shunt switch can be adapted to provide a dimming function of the lamp.

It is preferred that the power supply device comprises a power consumption detection unit for detecting the power consumed by the electrical consumer and a power supply for providing the output current depending on the detected power consumed by the electrical consumer. In particular, the power consumption detection unit is adapted to detect the output voltage of the power supply for detecting the power consumption, wherein the power supply is adapted to control the output current depending on the detected output voltage. This allows the power supply device to detect the power consumption of the electrical consumer in a relatively simple way just by detecting the output voltage of the power supply. The power supply may comprise a power converter for converting alternating current (AC) power to DC power to be supplied to the electrical consumer.

Preferentially, the power supply is adapted to control at least one of the amplitude and the timing of the output current depending on at least one of the amplitude and the timing of the detected output voltage. The timing of the output current defines at which temporal positions a respective amplitude is provided, in particular, the timing defines when the output current is set to a certain amplitude. The timing of the output voltage defines at which temporal positions a respective voltage is consumed by the electrical consumer, in particular, the timing defines when the voltage changes to a certain amplitude.

The power supply is preferentially adapted to compare the amplitude of the detected output voltage with one or several threshold amplitudes, thereby generating a comparison result, wherein the power supply is adapted to control the amplitude of the output current depending on the generated comparison result. For performing the comparison the power supply can comprise, for instance, a comparator. For more sophisticated control functions the power supply can comprise, for instance, an analog-to-digital converter and a microcontroller or a digital signal processor (DSP).

The power supply is preferentially adapted to provide a higher amplitude of the output current, when the amplitude of the detected output voltage is larger than a threshold voltage, and a lower amplitude of the output current, when the amplitude of the detected output voltage is smaller than the threshold voltage. The amplitude of the output current can therefore be modulated depending on the power consumed by the electrical consumer. In particular, if the electrical consumer is pulse-width modulated, the comparison of the amplitude of the detected voltage with the threshold voltage can yield the duty cycle of the PWM such that the power supply can be modulated in accordance with the duty cycle. The output power and, thus, losses in cables and possible other connecting elements are can therefore be reduced in accordance with a reduction of the power consumption of the electrical consumer due to the PWM. If the electrical consumer is a lamp with a dimming function provided by a pulse-width modulated shunt switch, the combination of the detected PWM duty cycles and the lower amplitude of the output current during short circuit periods, i.e. in shunted periods, can reduce losses during low power periods, in particular, off periods, of the PWM and improve flicker behavior over a full dim range.

The power supply device can be adapted to control the output current, in particular, the amplitude of the output current, depending on the detected output voltage in shunted periods only, in non-shunted periods only or in both, shunted periods and non-shunted periods.

The higher output current is preferentially a nominal current of the power distribution system, wherein the lower output current may be, for instance, ten percent of the nominal current.

In an embodiment at least one of the higher amplitude and the lower amplitude of the output current depends on the temporal length of the period in which the amplitude of the detected output voltage is smaller than the threshold voltage. For instance, the power supply can be adapted to provide the higher amplitude of the output current, when the amplitude of the detected output voltage is larger than the threshold voltage, provide a first lower amplitude of the output current, when the amplitude of the detected output voltage is smaller than the threshold voltage for a time being smaller than a temporal threshold, and provide a second lower amplitude of the output current being smaller than the first lower amplitude, when the amplitude of the detected output voltage is smaller than the threshold voltage for a time being larger than the temporal threshold. This functionality can allow the power supply device to also consider situations, in which the electrical consumer is completely switched off, thereby further reducing possible losses in cables and optional further connection elements.

If the power consumption of the electrical consumer is pulse-width modulated, the power supply can be adapted to determine the duty cycle of the PWM from the comparison result, wherein at least one of the higher amplitude and the lower amplitude depends on the determined duty cycle. In particular, if in a shunted period a lower amplitude of the output current is supplied and in a non-shunted period a higher amplitude of the output current is supplied, the higher amplitude in the non-shunted periods may depend on the duty cycle of the PWM. For instance, the power supply may be adapted such that the shorter the duty cycle the smaller the higher amplitude of the output current.

Preferentially, at least one full period of the PWM, in particular, only one full PWM period, is used for determining the actual duty cycle from the detected voltage, wherein in the following period the amplitude of the output current can be set in accordance with the determined duty cycle. If the electrical consumer is a lamp like a light-emitting diode (LED) with a pulse-width modulated shunted dimming function, this can lead to a load side dimmed solution with a mixed analog current modulation. Lamps with such a driving scheme may provide high efficiency solid-state lighting (SSL) solutions for low dim levels. These lamps may be used in corridors or other spaces that need a minimal constant flux level, for instance, for emergency purposes and only full flux level, when in use.

In a preferred embodiment the power supply is adapted to supply a constant power, if the variation of the power consumption is faster than a predefined threshold. The speed of the variation of the consumed power can be defined by a suitable measure being indicative of the speed of change of the consumed power. For instance, if the electrical consumer is pulse-width modulated, the power supply may supply a constant power, in particular, a nominal power, if the duty cycle of the PWM is larger than a predefined duty cycle threshold. The output power, in particular, the output current is therefore preferentially not reduced, whenever the duty cycle is so high that only short off periods would result, because changing the supplied power would not be advised due to dynamic behavior or because the periods with reduced losses are too short.

In a further aspect of the present invention a power distribution system is presented, wherein the power distribution system comprises an electrical consumer having a variable power consumption and a power supply device as defined in claim 1. The power distribution system may comprise one or several electrical consumers being connected to the power supply device. In an embodiment, the electrical consumer and the power supply device are electrically connected via an Ethernet cable like a Category 5 (Cat 5) cable, wherein the Ethernet cable is only used for transporting the electrical power and not for communication purposes. In another embodiment, the Ethernet cable may also be used for communication purposes or another kind of cable may be used for electrically connecting the electrical consumer and the power supply device.

In a further aspect of the present invention a power distribution method is presented, wherein the power distribution method comprises supplying power to an electrical consumer having a variable power consumption by a power supply device, wherein the power supply device is output current controlled and provides the output current depending on the power consumed by the electrical consumer.

In a further aspect of the present invention a power distribution computer program is presented, wherein the power distribution computer program comprises program code means for causing a power supply device as defined in claim 1 to carry out the steps of the power distribution method as defined in claim 14, when the power distribution computer program is run on a computer controlling the power supply device.

It shall be understood that the power supply device of claim 1, the power distribution system claim 12, the power distribution method of claim 14, and the power distribution computer program of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
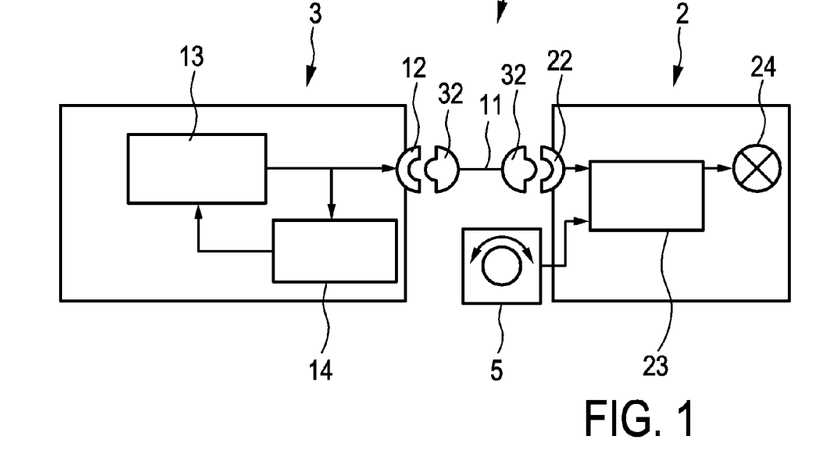
FIG. 1 shows schematically and exemplarily an embodiment of a power distribution system comprising a power supply device and an electrical consumer.

FIG. 1 shows schematically and exemplarily an embodiment of a power distribution system for distributing power from a power supply device 3 to an electrical consumer 2. In this power distribution system 1 the power supply device 3 and the electrical consumer 2 are electrically connected via a Cat 5 cable 11, which is coupled to the power supply device 3 and the electrical consumer 2 by using electrical connectors 12, 32, 22. The power distribution system 1 is adapted to distribute DC power, wherein the power supply device is output current controlled.

The power consumed by the electrical consumer 2 is variable by using a pulse-width modulated shunt circuit 23, wherein the PWM, i.e. the duty cycle of the PWM, is controllable by a user via a user control unit 5. In this embodiment, the electrical consumer 2 is a lamp comprising the user control unit 5, the pulse-width modulated shunt circuit 23 and a light source 24, wherein the user control unit 5 and the pulse-width modulated shunt circuit 23 provide a dimming function for the lamp 2. The pulse-width modulated shunt circuit is schematically and exemplarily shown in more detail in FIG. 2.

Figure 2:
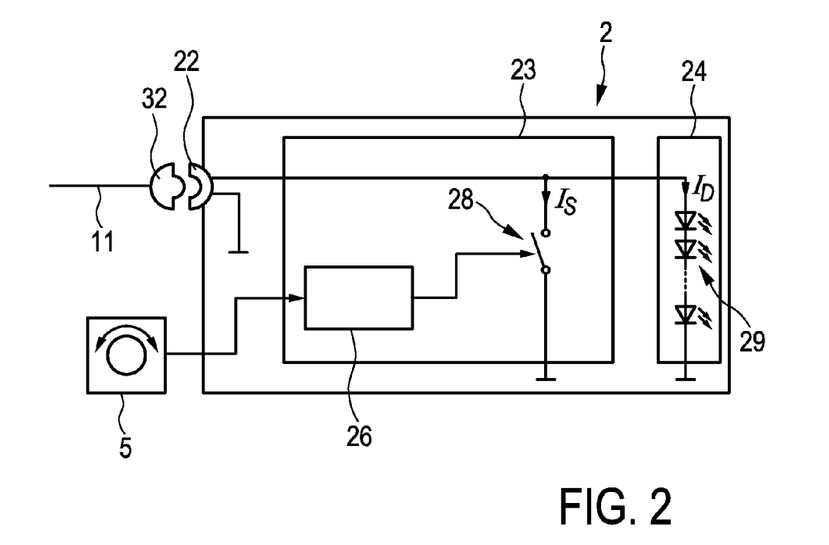
FIG. 2 shows schematically and exemplarily the electrical consumer in more detail.

The pulse-width modulated shunt circuit 23 comprises a PWM generator 26 and a shunt switch 28, wherein the duty cycle of the PWM generated by the PWM generator 26 is controllable via the user control unit 5. The light source 24 comprises, in this embodiment, several LED devices 29, which are connected in series.

Dimming can easily be applied by periodically short circuiting the voltage over the light source 24 by means of the shunt switch 28, wherein the on/off periods of the shunt switch 28 are controlled by the PWM generator 26. During the on periods of the shunting switch 28, which could also be regarded as being shunted periods, the current in the LED devices 29 can be reduced to zero for a full short. If in this case a known power supply device would be used, the output current would be still constantly provided, pass the Cat 5 cables and the electrical connectors and flow through the pulse-width modulated shunt circuit 23. This means all losses remain constant regardless of the on/off state or the dim level selected by a user via the user control unit 5. If the shunt switch 28 is switched off, i.e. during off periods, which could also be regarded as being non-shunted periods, the full output current flows to the light source 24. In FIG. 2 $I_S$ indicates the current flowing through the pulse-width modulated shunt circuit 23 and $I_D$ indicates the current flowing through the light source 24.

The power supply device 3 is adapted to provide the output current depending on the power consumed by the electrical consumer 2. It comprises a power consumption detection unit 14 for detecting the power consumed by the electrical consumer 2 and a power supply 13 for providing the output current depending on the detected power consumed by the electrical consumer 2. The power supply 13 comprises an AC/DC power converter for converting AC power provided by an AC power source to DC power to be supplied to the electrical consumer 2. In this embodiment the power consumption detection unit 14 is adapted to detect the output voltage of the power supply 13 for detecting the power consumption, wherein the power supply 13 is adapted to control the output current depending on the detected output voltage. The power supply 13 is preferentially adapted to control at least one of the amplitude and the timing of the output current depending on at least one of the amplitude and the timing of the detected output voltage. In particular, the power supply 13 is adapted to compare the amplitude of the detected output voltage with one or several threshold amplitudes, thereby generating a comparison result, wherein the power supply 13 controls the amplitude of the output current depending on the generated comparison result. For performing the comparison the power supply 13 can comprise, for instance, a comparator. For more sophisticated control functions, which will be described further below, the power supply 13 can comprise, for instance, an analog-to-digital converter and a microcontroller or a DSP.

The power supply 13 can be adapted to provide a higher amplitude of the output current, when the amplitude of the detected output voltage is larger than a threshold voltage, and a lower amplitude of the output current, when the amplitude of the detected output voltage is smaller than the threshold voltage. This modification of the amplitude of the output current depending on whether the detected output voltage is larger or smaller than the voltage threshold yields a modulation of the output current in accordance with the duty cycle of the PWM of the electrical consumer 2. In particular, since in this embodiment the electrical consumer 2 is a lamp with a dimming function provided by the pulse-width modulated shunt switch 28, the combination of the detected PWM duty cycles and the lower amplitude of the output current during the short circuit periods, i.e. in the shunted periods, reduces losses during the short circuit periods and improves flicker behavior over the full dim range. This control of the output current, in particular, of the amplitude of the output current, depending on the detected output voltage in the shunted periods will in the following exemplarily be described with reference to FIG. 3.

Figure 3:
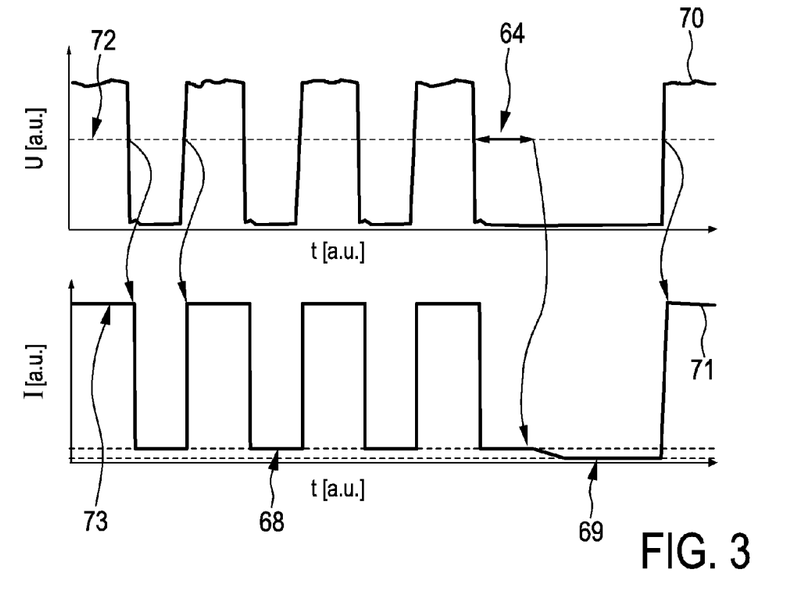
FIG. 3 shows schematically and exemplarily diagrams illustrating a dependence of an output current on a detected output voltage.

FIG. 3 shows in the upper part schematically and exemplarily the detected output voltage U in arbitrary units over time t in arbitrary units and in the lower part the controlled output current I in arbitrary units over the time t in arbitrary units. During normal on times, i.e. in the non-shunted periods, the output voltage 70 is above the threshold voltage 72, wherein in FIG. 3 the output voltage 70 is shown as being slightly varying due to fluctuations in the electrical consumer 2. In these non-shunted periods, which are detected by comparing the output voltage 70 with the threshold voltage 72, the output current 71 is set to a nominal current level 73, which defines the higher amplitude of the output current. Whenever the detected output voltage 70 is lower than the voltage threshold 72, the current set point gets switched to a reduced current level 68, which defines the lower amplitude of the output current and which may be, for instance, ten percent of the nominal current level 73. This can be done without affecting the electrical consumer 2 as the absolute value of the output current to the electrical consumer 2 is not important in the shunted periods, in which the electrical consumer 2 has been shortened by the shunt switch 28. When the shunt switch 28 opens again, the output voltage 70 rises above the threshold voltage 72, wherein this rising above the threshold voltage 72 is detected by the power consumption monitor 14 and the power supply 13, whereupon the current set point will be again set to the nominal current level 73. This control technique results in that all currents in the driver, i.e. in the power supply device 3, get modulated by the PWM in the electrical consumer 2, wherein the input power as well as the losses in cables and connecting elements are proportionally reduced. As resistive losses are proportional to the square of the current, the losses in the wire harness during the shunted periods will be approximately one percent of the losses without this measure, if the lower amplitude 68 of the output current is about ten percent of the higher amplitude 73 of the output current.

The power supply 13 may further be adapted such that at least one of the higher amplitude and the lower amplitude of the output current 71 depends on the temporal length of the period in which the amplitude of the detected output voltage 70 is smaller than the threshold voltage 72. In particular, the power supply 13 can be adapted to provide the higher amplitude 73 of the output current 71, when the amplitude of the detected output voltage 70 is larger than the threshold voltage 72, to provide a first lower amplitude 68 of the output current 71, when the amplitude of the detected output voltage 70 is smaller than the threshold voltage 72 for a time being smaller than a temporal threshold 64, and to provide a second lower amplitude 69 of the output current 71 being smaller than the first lower amplitude 68, when the amplitude of the detected output voltage 70 is smaller than the threshold voltage 72 for a time being larger than the temporal threshold 64. The timing of set point changes can therefore be optimized by controlling the set point to different values depending on the temporal length of the situation in which the detected output voltage is lower than the threshold voltage. This additional optional control of the output current depending of the length of the period, in which the detected output voltage is smaller than the threshold voltage, can be provided, for example, by an analog-to-digital converter and a microcontroller or a DSP of the power supply, and it can allow the power supply device 3 to also consider situations, in which the electrical consumer 2 is completely switched off, thereby further reducing possible losses in cables and electrical connectors.

The power supply 13 can also be adapted to determine the duty cycle of the PWM from the comparison of the detected output voltage with the threshold voltage, wherein at least one of the higher amplitude and the lower amplitude can depend on the determined duty cycle. In particular, if in the shunted periods a lower amplitude of the output current is supplied and in the non-shunted periods a higher amplitude of the output current is supplied, the higher amplitude in the non-shunted periods can depend on the duty cycle of the PWM. For instance, the power supply 13 can be adapted such that the shorter the duty cycle the smaller the higher amplitude of the output current. The detected duty cycle can therefore be used to adjust the nominal current during the non-shunted periods, which may further increase the efficiency of the power distribution system, as electrical consumers like LED devices and the whole described circuit gets better in efficiency, when driving lower currents. This adjusting of the nominal current during the non-shunted periods is exemplarily illustrated in FIG. 4.

Figure 4:
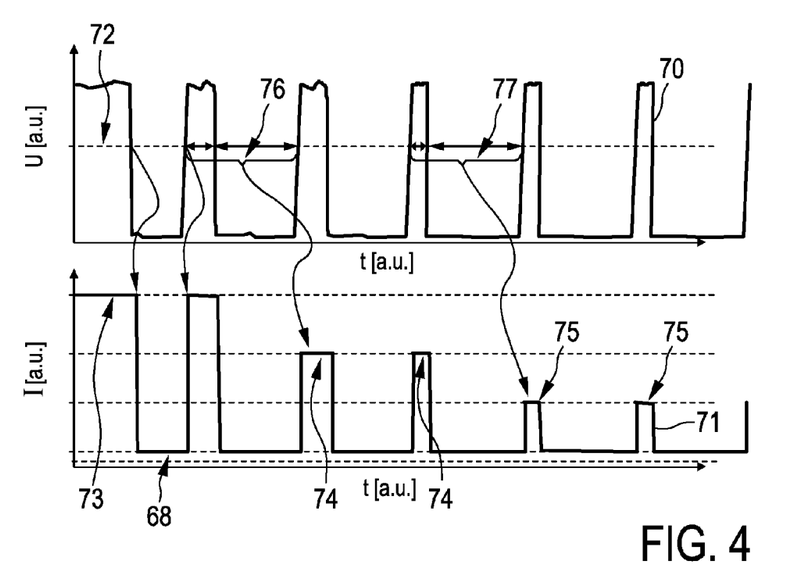
FIG. 4 shows schematically and exemplarily further diagrams illustrating a dependence of an output current on a detected output voltage.

Preferentially, a full PWM period is used for determining the actual duty cycle from the detected voltage 70. For instance, the full PWM period 76 can be used for determining the actual duty cycle, wherein the power supply 13 can be adapted to provide the output current with the amplitude 74 depending on the duty cycle detected from the full PWM period 76. In a further full PWM period 77 a shorter duty cycle is determined such that the power supply 13 reduces the amplitude of the output current depending on this determined duty cycle to the amplitude 75.

The power supply 13 can be further adapted to supply a constant power, if the variation of the power consumption is faster than a predefined threshold. In this embodiment, the power supply 13 supplies a constant output current, i.e. the nominal current, if the duty cycle of the PWM is larger than a predefined duty cycle threshold. The amplitude of the output current is therefore preferentially not reduced, whenever the duty cycle is so high that only short off periods would result, because in this situation changing the supplied power would not be advised due to the dynamic behavior of the system.

Figure 5:
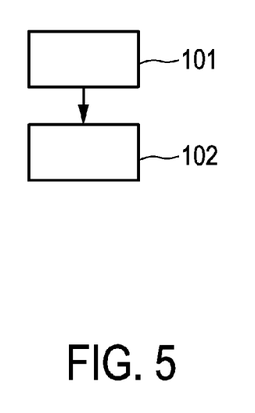
FIG. 5 shows a flowchart exemplarily illustrating a power distribution method.

In the following an embodiment of a power distribution method will exemplarily be described with reference to a flowchart shown in FIG. 5.

In step 101 the power supply provides the nominal output current to the electrical consumer. In step 102 the power consumption detection unit detects the output voltage of the power supply device, wherein, if the detected output voltage is smaller than the threshold voltage, the amplitude of the provided output current is reduced to a lower value. The detection of the output voltage of the power supply device in step 102 is performed continuously such that, if the output voltage of the power supply device rises again above the threshold voltage, the power supply supplies the higher, nominal output current, i.e. an output current with a higher amplitude. In this way the amplitude of the output current can be set in accordance with the power actually consumed by the electrical consumer.

The power distribution system 1 can use network cables as covered by the Power over Ethernet standard (IEEE 802.3.af) for distributing the power from the power supply device to the electrical consumer. Moreover, the power distribution system may be used for lighting over Ethernet, if the electrical consumer is, for instance, a lamp.

Although in FIG. 1 only a single electrical consumer is schematically and exemplarily shown, the power distribution system can comprise more than one electrical consumer, wherein each electrical consumer may be independently connected to the power supply device. In this case the power supply device is preferentially adapted to provide DC current separately to each electrical consumer and to monitor the power consumed by the respective electrical consumer, in order to control the provision of the DC current to the respective electrical consumer independently from controlling the provision of the DC current to the other electrical consumers, i.e., for instance, the power supply device can comprise corresponding ports, to which the electrical consumers can be connected, wherein each port can be monitored individually and wherein to each port DC current can be provided individually. The power supply device can comprise several power supplies and several power consumption detection units in accordance with the several electrical consumers of the power distribution system, in order to provide the individual monitoring and DC current provision functions. In particular, for each port of the power supply device a power supply and a power consumption detection unit may be provided.

Thus, the power supply device can be regarded as being a central power supply device with a current driver, i.e. with a power supply, for each output of the power supply device, wherein connectors and cables are used for connecting the power supply device with one or several electrical consumers which are preferentially lamps. However, electrical consumers can also be other electrical devices like fans, sensing devices, user interface devices like displays or switch panels, et cetera. The power supply device preferentially senses off periods of the respective electrical consumer and reduces during these off periods the output current for the respective electrical consumer to a lower amplitude. The power supply device can be regarded as comprising a current driver circuit equipped with a power consumption detection unit being preferentially a voltage monitor. The set point of the output current provided by the power supply device preferentially depends on the voltage level measured on the output circuit of the current driver.

If the power distribution system comprises several electrical consumers, at least some of the electrical consumers can also be connected in series to a same port of the power supply device, in order to provide the monitoring and DC current provision functions simultaneously for these electrical consumers.

Although in above described embodiments a user control unit is used for modifying the power consumed by the electrical consumer, particularly for modifying the duty cycle of the PWM, in other embodiments also other control means can be used for modifying the power consumed by the electrical consumer. For instance, a light sensor like a daylight sensor may be used as control means, especially if the electrical consumer is a lamp and the light provided by the lamp should be controlled depending on the environmental light. Also another kind of sensor like a presence sensor sensing whether, for instance, a person is in a room to be illuminated by the lamp can be used as the control means.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Actions like detecting the output voltage, comparing the output voltage with the threshold voltage, determining the duty cycle of the PWM et cetera performed by one or several units or devices can be performed by any other number of units or devices. These actions and/or the control of the power supply device in accordance with the power distribution method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A power distribution system comprises:
an electrical consumer having a controllable pulse-width modulated shunt switch for allowing for a controllable power consumption of the electrical consumer, and
a power supply device for supplying power to the electrical consumer, wherein the power supply device is output current controlled and is configured to provide an output current depending on the power consumed by the electrical consumer, wherein the power supply device is configured to compare an amplitude of a detected output voltage with one or several threshold amplitudes, thereby generating a comparison result, wherein the power supply device is configured to control an amplitude of the output current depending on the generated comparison result.

2. The power distribution system as defined in claim 1, wherein the power supply device comprises a power consumption detection unit for detecting the power consumed by the electrical consumer and a power supply for providing the output current depending on the detected power consumed by the electrical consumer.

3. The power distribution system as defined in claim 2, wherein the power consumption detection unit is adapted to detect the output voltage of the power supply for detecting the power consumption, wherein the power supply is configured to control the output current depending on the detected output voltage.

4. The power distribution system as defined in claim 3, wherein the power supply is configured to control at least one of the amplitude and the timing of the output current depending on at least one of the amplitude and the timing of the detected output voltage.

5. The power distribution system as defined in claim 1, wherein the power supply is adapted to provide a higher amplitude of the output current, when the amplitude of the detected output voltage is larger than a threshold voltage, and a lower amplitude of the output current, when the amplitude of the detected output voltage is smaller than the threshold voltage.

6. The power distribution system as defined in claim 5, wherein at least one of the higher amplitude and the lower amplitude of the output current depends on the temporal length of the period in which the amplitude of the detected output voltage is smaller than the threshold voltage.

7. The power distribution system as defined in claim 6, wherein the power supply is configured to provide the higher amplitude of the output current, when the amplitude of the detected output voltage is larger than the threshold voltage, a first lower amplitude of the output current, when the amplitude of the detected output voltage is smaller than the threshold voltage for a time being smaller than a temporal threshold, and second lower amplitude of the output current being smaller than the first lower amplitude, when the amplitude of the detected output voltage is smaller than the threshold voltage for a time being larger than the temporal threshold.

8. The power distribution system as defined in claim 5, wherein the power supply is adapted to determine the duty cycle of the pulse-width modulation from the comparison result, wherein at least one of the higher amplitude and the lower amplitude depends on the determined duty cycle.

9. The power distribution system as defined in claim 8, wherein the power supply is configured such that the shorter the duty cycle the smaller the higher amplitude of the output current.

10. The power distribution system as defined in claim 1, wherein the power supply is configured to supply a constant power, if the variation of the power consumption is faster than a predefined threshold.

11. The power distribution system as defined in claim 1, wherein the electrical consumer and the power supply device are electrically connected via an Ethernet cable.

12. A power distribution method comprising steps of:
controlling a pulse-width modulated shunt switch of an electrical consumer for controlling the power consumption of the electrical consumer,
supplying power to the electrical consumer by a power supply device, wherein the power supply device is output current controlled and provides an output current depending on the power consumed by the electrical consumer, and
comparing an amplitude of a detected output voltage with one or several threshold amplitudes, thereby generating a comparison result, and controlling an amplitude of the output current depending on the generated comparison result.

13. A non-transitory computer readable medium comprising a computer readable program for power distribution, wherein the computer readable program when executed on a computer causes the computer to perform the steps of:

controlling a pulse-width modulated shunt switch of an electrical consumer for controlling the power consumption of the electrical consumer, supplying power for the electrical consumer by a power supply device, wherein the power supply device is output current controlled and provides an output current depending on the power consumed by the electrical consumer, and comparing an amplitude of a detected output voltage with one or several threshold amplitudes, thereby generating a comparison result, and controlling an amplitude of the output current depending on the generated comparison result.

14. The power distribution method as defined in claim 12, wherein the method further comprises providing a higher amplitude of the output current, when the amplitude of the detected output voltage is larger than a threshold voltage, and a lower amplitude of the output current, when the amplitude of the detected output voltage is smaller than the threshold voltage.

15. The power distribution method as defined in claim 14, wherein the method further comprises providing the higher amplitude of the output current, when the amplitude of the detected output voltage is larger than the threshold voltage, a first lower amplitude of the output current, when the amplitude of the detected output voltage is smaller than the threshold voltage for a time being smaller than a temporal threshold, and second lower amplitude of the output current being smaller than the first lower amplitude, when the amplitude of the detected output voltage is smaller than the threshold voltage for a time being larger than the temporal threshold.

16. The power distribution method as defined in claim 14, wherein the method further comprises determining the duty cycle of the pulse-width modulation from the comparison result, wherein at least one of the higher amplitude and the lower amplitude depends on the determined duty cycle.

17. The power distribution method as defined in claim 12, wherein the method further comprises supplying a constant power, if the variation of the power consumption is faster than a predefined threshold.

* * * * *